Oct. 19, 1954  R. W. WILSON  2,691,931
SPRING LOADED FURROW WHEEL
Filed Feb. 27, 1952
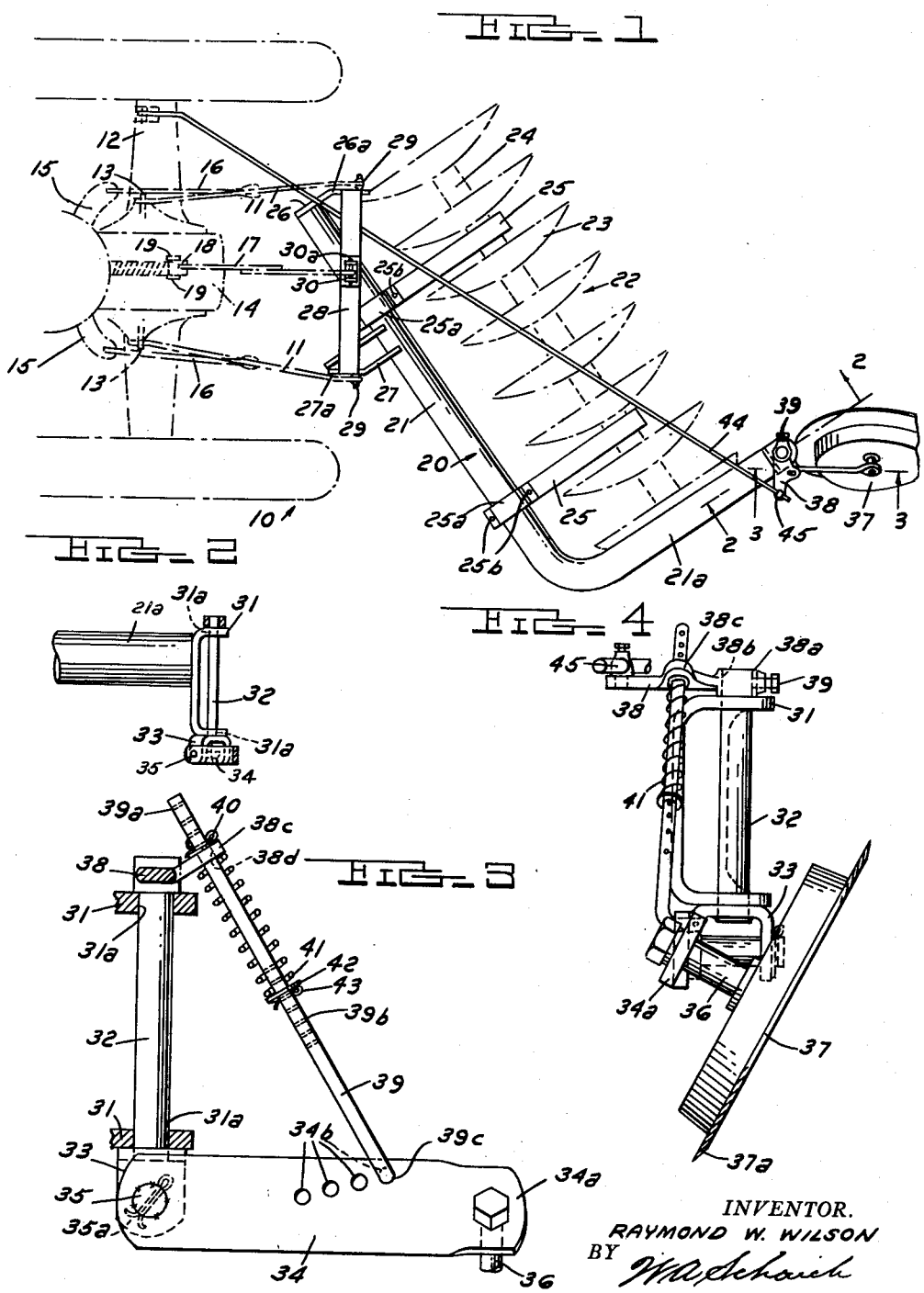
INVENTOR.
RAYMOND W. WILSON
BY
ATTORNEYS

Patented Oct. 19, 1954

2,691,931

UNITED STATES PATENT OFFICE

2,691,931

SPRING LOADED FURROW WHEEL

Raymond W. Wilson, Ferndale, Mich., assignor, by mesne assignments, to Ford Motor Company, Dearborn, Mich., a corporation of Delaware Application February 27, 1952, Serial No. 273,619

2 Claims. (Cl. 97—47.1)

This invention relates to a spring loaded furrow wheel and more particularly to an improved spring loaded furrow wheel for disc plows and disc tillers.

Disc tilling implements are often used in extremely rough ground and in uneven terrain and where the soil characteristics vary widely. Such conditions practically preclude the use of a moldboard plow for such land and, hence, the disc type of plow is an extremely valuable tool for tilling such soil.

Disc type tilling tools impose inordinately large side draft forces on the tractor which, however, may be reduced to a large extent by a furrow wheel. The furrow wheel is generally turned by a link connected between the tractor and the furrow wheel so that such furrow wheel steers the implement as the tractor is turned. Outside of the steerable feature most furrow wheels for disc type implements are non-adjustable, which for usage in uniformly textured soil is ordinarily satisfactory. However, where the disc tilling implement is utilized in all sorts of soil conditions, a relatively fixed furrow wheel does not provide for optimum steering of the implement or resistance to side draft forces, as for example, when the implement goes from hard to soft soil and when the implement is used on bumpy or rigid terrain.

Accordingly, it is an object of this invention to provide a spring loaded furrow wheel for disc tilling implements to improve the steering characteristics of the tillage implement.

Another object of this invention is to provide an improved furrow wheel for disc type implements which is resiliently mounted on the implement so that the furrow wheel is urged into the the ground at all times to thereby improve the steering and side draft resistance characteristics of such furrow wheel irrespective of variable soil conditions and terrain.

The specific nature of this invention, as well as other objects and advantages thereof, will become apparent to those skilled in the art from the following detailed description, taken in conjunction with the drawings on which, by way of preferred example only, is illustrated one embodiment of this invention.

On the drawings:

Figure 1 is a plan view of a disc tiller shown mounted on a tractor, such tiller incorporating the spring loaded furrow wheel constructed in accordance with this invention;

Figure 2 is an enlarged scale sectional view taken along the plane 2—2 of Figure 1;

Figure 3 is an enlarged scale sectional view taken along the plane 3—3 of Figure 1; and Figure 4 is an enlarged scale detail, rear end view of the furrow wheel and its mounting.

As shown on the drawings:

In Figure 1 there is shown a tractor 10 which has a pair of power-lifted hitch links 11 pivotally connected to the tractor rear axle housing 12 at laterally spaced points 13. The hitch links 11 are power-lifted by a built-in conventional hydraulic mechanism (not shown) which rocks a laterally disposed rock shaft (not shown), journaled in the upper portion of the tractor differential housing 14, to rock a pair of rock arms 15 respectively secured to the ends of the aforementioned rock shaft. Lift links 16 connected respectively to the ends of the rock arms 15 and to a medial portion of hitch links 11 effect raising of the hitch links 11. Tractor 10 has a top link 17 which has its front end pivotally connected to a rocker member 18. Such rocker is pivotally mounted on a suitable transverse pin (not shown) between a pair of integral upstanding lugs 19 provided on top of the housing 14. All of the above described elements of the tractor are well-known and, hence, further description thereof is not believed necessary.

A disc type implement, such as a disc tiller 20 to which the improved furrow wheel of this invention is conveniently applied, comprises a main tubular frame 21 angularly disposed to the longitudinal axis of the tractor 10. The one end 21a of frame 21 is bent at right angles to the main portion thereof so that such end projects substantially rearwardly. A disc gang 22, comprising the usual concave cutting discs 23 mounted on a gang bolt (not shown) and separated in axially spaced relationship by spacers 24, is suitably rotatably journaled in a pair of horizontal rearwardly extending disc gang support arms 25. Arms 25 are respectively secured in axially spaced relationship on the main portion of frame 21 by a pair of clamps 25a which are secured to the arms 25 as by bolts 25b.

A pair of brackets 26 and 27 are secured by welding to the main frame 21. The bracket 26 is secured to the forward end of the main frame 21 and bracket 27 is disposed at a rearwardly and laterally spaced point from the bracket 26. The bracket 26 has a horizontal end portion 26a which projects rearwardly and bracket 27 has a horizontal end portion 27a which projects forwardly. An upright A-frame 28 has its lower ends respectively welded to the top of the end portions 26a and 27a, as best shown in Figure 1. The rearwardly and forwardly extending end portions 26a and 27a of brackets 26 and 27 thus angularly dispose the A-frame relative to the main frame 21 and, as best shown in Figure 1, perpendicular to the longitudinal axis of the tractor 10.

A pair of mounting pins 29 are respectively secured in the arm portions 26a and 27a which conveniently receive the apertured trailing ends of hitch links 11. The tractor top link 17 has its trailing end universally connected to a U-shaped bracket 30 secured by welding to the top of A-frame 28. A transverse pin 30a inserted through suitable aligned holes in the bracket 30 and through the apertured trailing end of the top link 17 effects connection of the top link to the bracket 30. A more detailed description of the disc tiller 20 is not believed necessary as such directly forms no part of this invention.

The trailing end of the frame end portion 21a has a U-shaped bracket 31 vertically secured by welding thereto. The bracket 31 has vertically aligned apertures 31a in its horizontal arms which rotatably journal a vertical shaft 32. The shaft 32 has a U-shaped bracket 33 secured as by welding to its lower end. A generally horizontal bar-like arm 34 has one end pivotally connected by a transverse pin 35 to one arm of the U-shaped bracket 33. The transverse pin 35 is inserted through horizontally aligned holes in the vertical arms of brackets 33 and through a suitable hole in arm 34. Pin 35 is secured against displacement by a cotter pin 35a inserted through a diametrically disposed hole provided in one end of the pin 35. The other end of arm 34 is twisted, as shown at 34a to dispose such end at an angle to the main portion of arm 34. The twisted end 34a of arm 34 is apertured to receive a stub shaft 36. A furrow wheel 37 is journaled on the end of stub shaft 36. The inclination of the twisted end 34a vertically inclines the furrow wheel 37 relative to the vertical shaft 32, as best shown in Figure 4. Furrow wheel 37 has a peripheral edge flange 37a sharpened to penetrate the soil.

A lever arm 38 has an enlarged cylindrical hub portion 38a on one end which is provided with an axial vertical bore 38b to permit mounting the lever arm 38 on the upper end of the vertical shaft 32. The hub portion 38a rests on top of the upper arm of bracket 31 and a radially disposed set screw 39 in the hub 38a locks the lever arm 38 relative to vertical shaft 32 when such screw is tightened thereagainst. The lever arm 38 has an integral lug 38c formed on a medial portion of the arm 38 and such lug is upwardly inclined relative to the arm 38, as best shown in Figures 3 and 4. A transverse aperture 38d is provided in the lug 38c to slidably receive a rod-like link 39. The upper end of rod 39 has a plurality of axially spaced transverse holes 39a and a cotter pin 40 is inserted in a selected one of such holes to limit the downward movement of the link 39. A plurality of axially spaced transverse holes 39b are provided in the medial portion of the link 39 for a purpose to be presently explained. The lower end 39c of link 39 is bent at right angles and such end is selectively insertable in any one of a plurality of holes 34b provided in a medial portion of arm 34. The holes 34b are disposed in a straight line which is, however, sloped relative to the horizontal axis of the arm 34, as best shown in Figure 3. A compression spring 41 surrounds the rod-like link 39 and the upper end of spring 41 abuts the underside of the lug 38c. The lower end of spring 41 abuts a washer 42 which surrounds the rod-like link 39 and the washer is secured in place by a cotter pin 43 inserted in a selected one of the transverse holes 39b. Thus, the spring 41 exerts a force against the arm 34 which tends to resist upward movement or movement in a counter-clockwise direction of arm 34, as shown in Figure 3.

The furrow wheel 37 is steered by the tractor 10 through the medium of link 44 which has its forward end connected to the underside of the tractor rear axle 12, as best shown in Figure 1. The rear end of link 44 is connected to the outer end of lever 38 by a suitable swiveling connector 45. Thus, when the tractor is turned, the link will be moved forwardly or rearwardly to effect rotation of the lever 38 which in turn rotates the furrow wheel 37 in the proper direction to facilitate steering of the rear end of the implement 20 in a manner well-known.

Operation

When tilling the soil with the disc tiller 20 attached to tractor 10, as shown in Figure 1, the furrow wheel 37 rides against the furrow wall formed by the rearmost disc 23 and the bottom portion of flange 37a, thereof, bites into the soil to provide steerability. As the disc gang 22 tills the soil, spring 41 exerts a bias on the arm 34 at all times which tends to force the furrow wheel into the soil regardless of the soil conditions encountered. Thus, improved steerability and resistance to side draft forces will be obtained. By selectively positioning the cotter pins 40 and 43 along the link 39 in other of the holes 39a and 39b respectively, the effective force of spring 41 acting against furrow wheel 37 may be greatly varied. It will be noted too that repositioning the end portion 39c of link 39 in any of the holes 34b nearer shaft 32, the angular relationship of arm 34 with shaft 32 will be varied. Thus it will be evident that an increased loading on the furrow wheel 37 may be readily obtained without the necessity of pre-loading spring 41 to any great extent. Hence a wide range of operating conditions may be readily met.

From the foregoing description, it is clearly apparent that there is here provided an improved furrow wheel mounting which is spring loaded to force such furrow wheel into ground engagement so as to insure optimum steerability of the furrow wheel as well as improving its function as a side draft resisting device in widely varying soil textures and relative compactness thereof as well as on uneven ground.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a disc plow having a frame adapted for attachment to a tractor, a U-shaped bracket secured to the trailing end of said frame, a shaft vertically journaled in said bracket, a rearwardly extending arm vertically pivotally mounted on the lower end of said shaft, said arm having a plurality of transverse substantially longitudinally spaced holes in the medial portion thereof, a lever arm secured to the upper end of said shaft, an apertured lug on the medial portion of said lever arm, a link member having its one end slidably inserted in said lug aperture and its other end bent for insertion in a selected one of said transverse arm holes, means for adjustably limiting the downward sliding movement of said link in said lug aperture, a spring surrounding said link member and having its one end in abutment with said lug, axially positionable means on said link member abutting the other end of said spring, a furrow wheel journaled on the lower end of said pivoted arm, and a steering link having its ends respectively connected to the tractor axle and said lever arm for rotating said furrow wheel about the vertical axis of said shaft in response to turning of the tractor, said link member being thereby selectively positionable on said arm and adjustably spring loaded to maintain said furrow wheel in ground contact for variable soil conditions.

2. In a disc plow having a frame adapted for attachment to a tractor, a U-shaped yoke rigidly secured to the trailing end of said frame, a shaft vertically journaled in said yoke, said shaft having a vertically disposed second U-shaped yoke rigidly secured to its lower end, a second shaft horizontally journaled in said second yoke, a rearwardly extending arm carried by said second shaft, said arm having a plurality of transverse substantially longitudinally spaced holes in the medial portion thereof, a lever arm horizontally rigidly secured to the upper end of said first shaft, an apertured lug on the medial portion of said lever arm, a link member having its one end slidably inserted in said lug aperture and its other end bent for insertion in a selected one of said transverse arm holes, means for adjustably limiting the downward movement of said link in said lug aperture, a spring surrounding said link member and having its one end in abutment with the underside of said lug, axially positionable means on said link member abutting the other end of said spring, a furrow wheel journaled on the free end of said rearwardly extending arm, and a fixed length steering link having its one end adapted for connection to the tractor rear axle and its other end adjustably pivotally connected to said lever arm for rotating said furrow wheel about the vertical axis of said first shaft in response to turning of the tractor, said link being thereby selectively positionable on said rearwardly extending arm and adjustably spring loaded to maintain said furrow wheel in ground contact for variable soil conditions.

References Cited in the file of this patent

UNITED STATES PATENTS

| Number | Name | Date |
|---|---|---|
| 458,371 | McSherry | Aug. 25, 1891 |
| 641,498 | Crain et al. | Jan. 16, 1900 |
| 1,965,927 | Mahan | July 10, 1934 |
| 2,038,715 | Chambers | Apr. 28, 1936 |
| 2,600,359 | Coviello | June 10, 1952 |

OTHER REFERENCES

Publication, April 1950, "British Farm Mechanization," vol. 3, No. 13, page 138.